United States Patent [19]

Brum

[11] Patent Number: 4,718,320

[45] Date of Patent: Jan. 12, 1988

[54] TOWED DECOY SYSTEM

[75] Inventor: Roger D. Brum, Irvine, Calif.

[73] Assignee: Southwest Aerospace Corporation, Santa Ana, Calif.

[21] Appl. No.: 3,248

[22] Filed: Jan. 12, 1987

[51] Int. Cl.$^4$ .............................. F41F 1/00
[52] U.S. Cl. ................... 89/1.11; 244/1 TD; 244/34 A; 273/360; 273/361
[58] Field of Search ............ 244/1 TD, 3, 34 A; 89/1.8, 1.14, 1.34, 1.51, 1.57, 1.811, 1.1, 1.11; 273/360, 361

[56] References Cited

U.S. PATENT DOCUMENTS

| | | | |
|---|---|---|---|
| 2,381,130 | 8/1945 | Lloyd | 244/1 TD X |
| 2,551,596 | 5/1951 | Haglund | 273/360 X |
| 2,813,719 | 11/1957 | Hopper | 273/361 |
| 2,907,536 | 10/1959 | Von Zborowski | 244/34 A X |
| 2,923,549 | 2/1960 | Hopper et al. | 244/1 TD |
| 3,002,708 | 10/1961 | Wetzel et al. | 273/361 X |
| 3,135,511 | 6/1964 | Norman et al. | 273/360 |
| 3,505,926 | 4/1970 | Johnson | 89/1.34 |
| 3,808,941 | 5/1974 | Biggs | 89/1.51 |
| 4,607,849 | 8/1986 | Smith | 273/348.1 |

FOREIGN PATENT DOCUMENTS

| | | | |
|---|---|---|---|
| 1229397 | 9/1960 | Fed. Rep. of Germany | 244/1 TD |
| 1336769 | 7/1963 | France | 244/1 TD |

Primary Examiner—David H. Brown
Attorney, Agent, or Firm—Stetina and Brunda

[57] ABSTRACT

A towed decoy system is disclosed characterized by use of a rotating tow line spool having an axial bore therethrough adapted to receive a pyrotechnic charge adjacent one end thereof and communicate gas pressure upon detonation of the charge to the decoy to deploy the decoy from an aircraft. The pryotechnic charge may be externally loaded into the system without the need to disassemble the decoy system and the use of the axial bore through the spool results in desired space economies.

11 Claims, 6 Drawing Figures

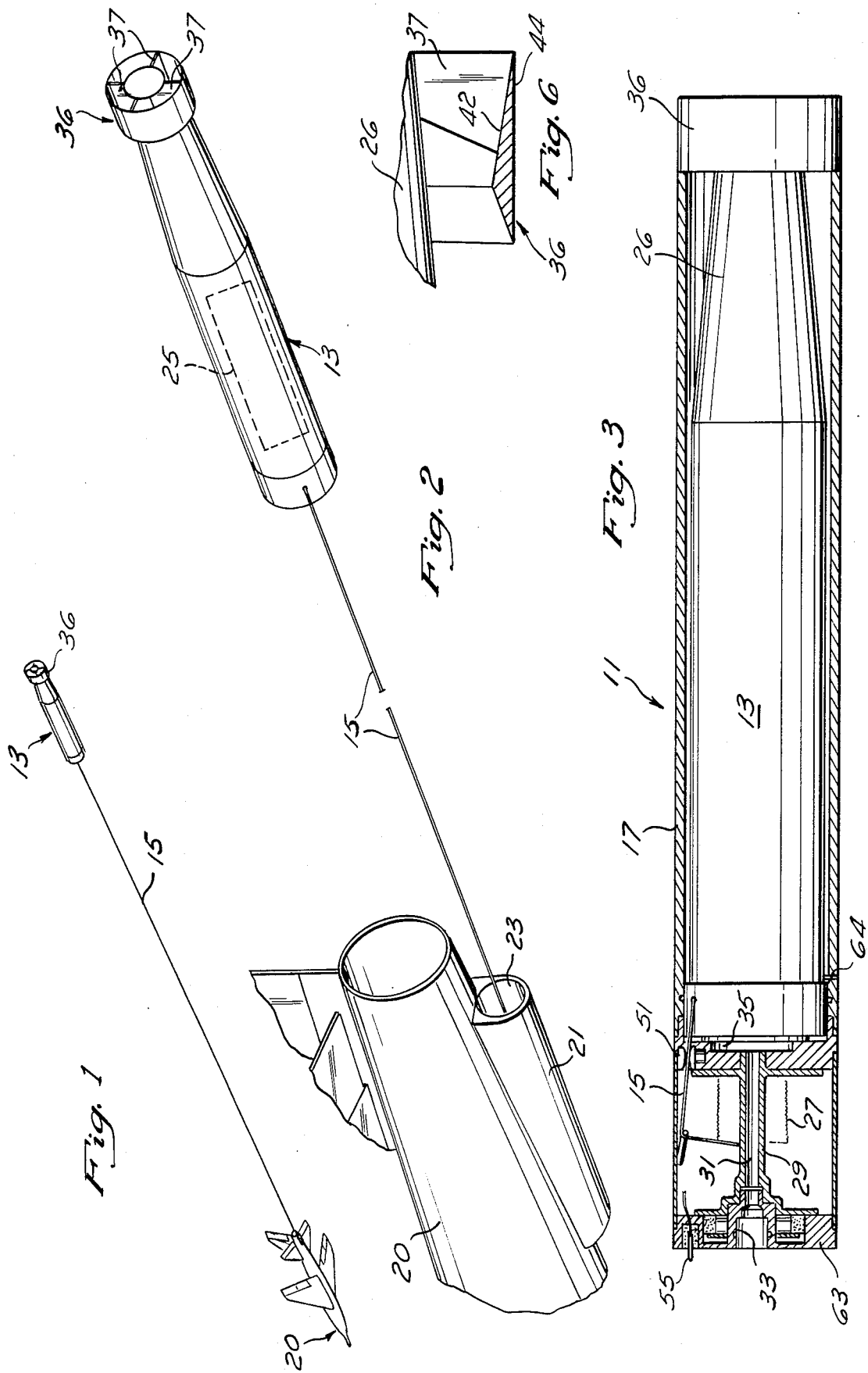

TOWED DECOY SYSTEM

BACKGROUND OF THE INVENTION

The present invention relates to decoys and, more particularly, to an advanced airborne decoy system adapted to be towed behind military aircraft.

Aircraft decoys are used to draw various types of guided weapons away from an aircraft that the weapons are intended to destroy. Such systems contain various types of electronic circuits to create an apparent target to the weapon to attract the weapon to the decoy, rather than the aircraft.

Various types of thermal and electronic towed decoy devices have been used for many years as defensive systems for aircraft. Such devices include flares designed to attract infrared guided missiles and active electronic devices (e.g. transponders) adapted to receive radar signals and rebroadcast an amplified return signal. The flare or transponder is designed to present a larger thermal or electronic target than the aircraft from which it is deployed and thereby attract the weapon away from the aircraft. As the programing of anti-aircraft weaponry becomes more sophisticated to better discriminate between decoys and aircraft, the need to provide decoys with enhanced capabilities similarly evolves. Moreover, insofar as different anti-aircraft weapons utilize different types of electronic or thermal imaging systems, there exists a need to maintain an adequate inventory to defeat an attack by any of a variety of different types of anti-aircraft weapons that may be fired at the aircraft.

The principal limitations in the use of various types of thermal and electronic decoying devices are the space, weight and economic limitations relative to the inclusion of any type of ordnance aboard an aircraft. Inclusion of a large number of expendable defensive systems may result in weight and drag penalties that may limit the performance envelope of the aircraft and thereby limit the pilot's ability to maneuver the aircraft away from the threat. Accordingly, it is highly desirable to devise towed decoys and towed decoy deployment systems that can cooperate with on-board defensive systems to defeat a variety of different types of anti-aircraft threats, with minimum space requirements and without imposing undue weight or drag penalties on the aircraft performance.

Aside from the aforementioned limitations relating to the aircraft performace, other limitations exist with respect to the maintenance of towed decoy deployment systems. One such limitation relates to the conventional use of pyrotechnic explosive charges to rapidly deploy, i.e. eject the decoy from the aircraft as needed. Proposed towed decoy systems utilize decoys disposed in cannisters having explosive ejection charges contained within the body of the cannister between the towline spool or payout mechanism and the stored decoy. Because the explosive charges have a limited shelf life, cannisters which have exceeded that shelf life would have to be disassembled to replace the explosive ejection charge. Due to system complexity, such disassembly is not normally permissible by aircraft maintenance technicians in the field and therefore must be performed at depot level maintenance facilities. Thus, the cannisters would typically be removed and shipped to remote maintenance facilities to affect periodic replacement of the ejection charge. Such procedures limit the readiness status of the equipment and contribute to unacceptable expenses which detract from efficient use of limited amounts of funds.

SUMMARY OF THE INVENTION

The present invention is directed toward meeting the aforementioned shortcomings in towed decoy systems. The invention is directed to a towed decoy and deployment system that makes more economical use of available on board storage space, thus limiting space penalties and permitting the inclusion of additional decoys within the available space envelope within the aircraft. The invention is also directed to expendable decoy deployment or ejection system wherein the ejection charge may be externally loaded, without the need to disassemble the cannister housing containing the expendable decoy and the towline payout system. Accordingly, the present invention permits enhancement of the defensive capabilities of an aircraft while limiting the time needed to periodically maintain those defensive system.

BRIEF DESCRIPTION OF THE DRAWINGS

These as well as other features of the present invention will become more apparent upon reference to the drawings wherein:

FIG. 1 illustrates a decoy being towed by an aircraft;

FIG. 2 is an enlarged view of a portion of FIG. 1 showing the housing supporting the deployment or ejection system and the towed decoy attached thereto;

FIG. 3 is a sectional view of the cannister containing the decoy and deployment system formed in accordance with the present invention;

FIG. 6 is a sectional view illustrating the tail fin cowling of the towed decoy.

DETAILED DESCRIPTION OF THE PRESENTLY PREFERRED EMBODIMENT

Figure 4:
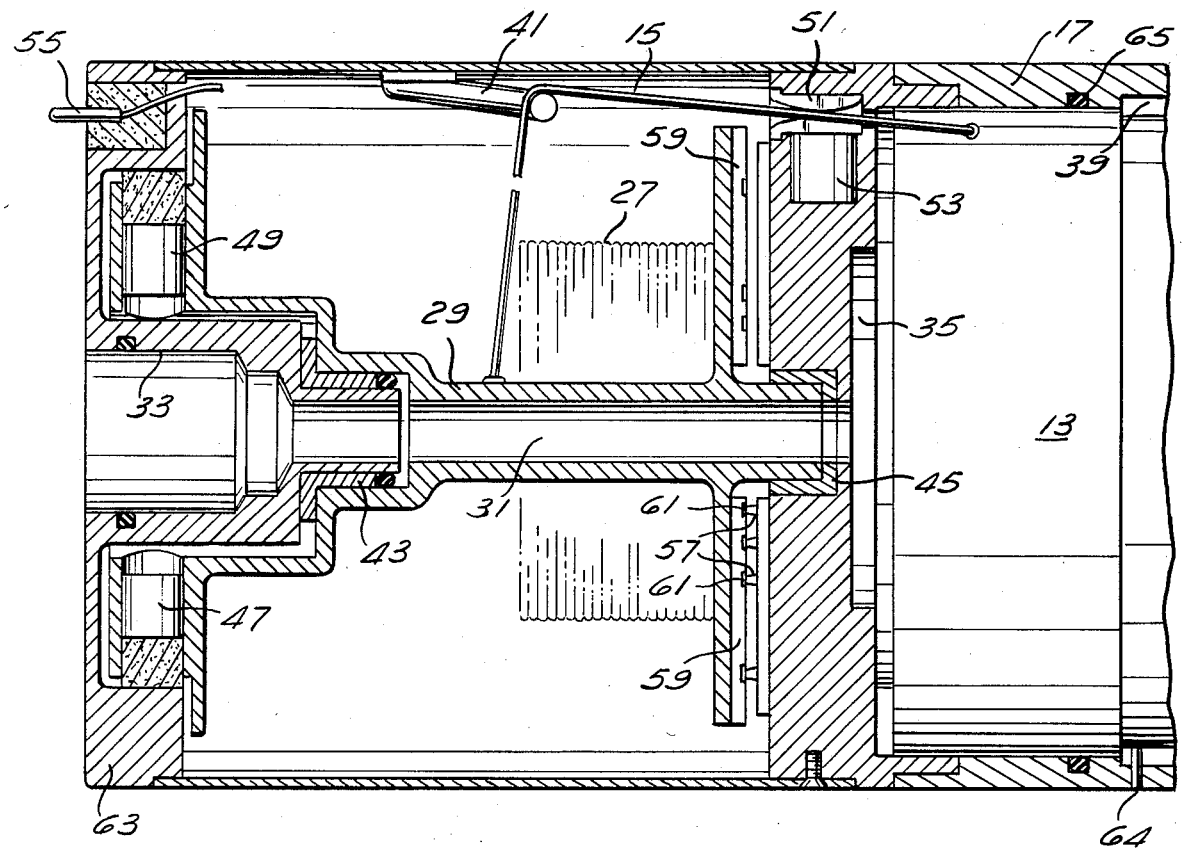
FIG. 4 is an enlarged view of a portion of FIG. 3 illustrating the towline spool and payout system.

The detailed description set forth below in connection with the appended drawings is intended merely as a description of the presently preferred embodiment of the invention, and is not intended to represent the only form in which the present invention may be constructed or utilized. The description sets forth the functions and steps for utilizing the invention in connection with the illustrated embodiment. It is to be understood, however, that the same or equivalent functions may be accomplished by different embodiments that are also intended to be encompassed within the spirit and scope of the invention.

FIG. 1 illustrates a towed decoy 13 being towed by an aircraft 20, connected to the decoy by a towline 15. The decoy 13 may be any of a plurality of different types of decoys intended to draw any aircraft weaponry away from aircraft 20.

FIG. 2 is an enlarged view of a portion of FIG. 1 showing the tail assembly of an aircraft 20 in more detail along with the structure of the decoy 13. Aircraft 20 is shown to include the housing 21 having an aperture 23 formed therein. In practice, the housing 21 may be formed about a multiplicity of decoy cannisters such as the cannister 11, shown at FIG. 3. The housing may be situated at various angles and locations on the aircraft.

Each of the cannisters may be adapted to include a decoy, a decoy ejection mechanism for discharging the decoy from the aircraft 20 and towline payout system. In the presently preferred embodiment the cannister is formed to be approximately 2.75 inches in diameter and approximately 19.0 inches in length so as to be utilized in conventional rocket launcher stores. Depending upon the aircraft space available, approximately six to eight cannisters may be carried within the housing or store assembly for deployment as necessary.

The tow line 15 connecting to the decoy is adapted to communicate electrical signals to the decoy to regulate the operation of the defensive systems housed in the decoy. The tow line 15 also serves the towing function of insuring that the decoy remains connected to the aircraft 20.

Electronic circuitry 25 is disposed within the decoy 13. Electronic circuitry 25 is typically adapted to receive interrogating signals from the anti-aircraft weapon system and control signals from control circuitry in aircraft 20 and to generate responsive signals intended to interfere with the operation of anti-aircraft weaponry. In practice, circuitry 25 may be a transponder adapted to receive and amplify interrogating radar signals such that the decoy generates a stronger radar signature than aircraft 20, thereby attracting anti-aircraft weaponry to the decoy rather than to aricraft 20. Circuitry 25 may be arranged to operate in a variety of different frequency ranges to defeat different types of anti-aircraft guidance systems. It is to be understood, however, that the invention is not intended to be limited to use in conjunction with a particular type of circuitry carried in the decoy.

FIG. 3 illustrates the construction of an exemplary cannister 11 including decoy 13, a decoy ejection mechanism and towline payout system, illustrated in more detail at FIG. 4. As shown at FIG. 3 decoy 13 is disposed within cannister housing 17. Tow line 15 is connected to the decoy and is stored for deployment in windings 27 formed about the central axis of a rotatable spool 29. The spool 29 has an axial bore 31 formed therethrough, extending from a charge cavity 33, formed in end cap 63, to a load spreading cavity 35 formed in front of the forward surface of decoy 13. As explained in more detail below, the detonation of a pyrotechnic charge placed in charge cavity 33 will cause gas pressure to pass through, i.e. be communicated through the axial bore 31, resulting in the discharge of decoy 13 from cannister 11.

FIG. 4 provides more detail of the decoy deployment or ejection mechanism formed within the cannister 11. The mechanism is designed to receive a pyrotechnic charge such as an MK131 MODO charge within charge cavity 33. When the charge within charge cavity 33 is detonated the resulting gases are directed through axial bore 31 of reel 29 where they pass to load spreading cavity 35 which applies pressure to the front portion of decoy 13. The resulting force shears shear pin 64 and urges the decoy 13 axially outward away from charge cavity 33 and upon travel along the axial length of the cannister 11, the decoy is thereby ejected. As the decoy 13 is urged out of the cannister 11, tow line 15 is unwound from the windings 27, by rotation of the spool 29, and passes along tow line guide 41. Recesses 39 are provided within the housing 17 downstream of a sealing o-ring 65 to reduce vapor lock that may oppose the discharge of decoy 13 from cannister housing 17.

The spool 29 is mounted on bearings 43 and 45 to facilitate axial rotation of the spool. Centrifugal brakes 47 and 49 serve to oppose the rotation of reel 29 and thereby regulate the reeling pay-out speed of the deployed tow line. The tow line also passes through tow line cable cutter 51 which is effective to cut the tow line line through guillotine action of opposing plates when a pyrotechnic charge disposed in charge cavity 53 is detonated.

Figure 5:
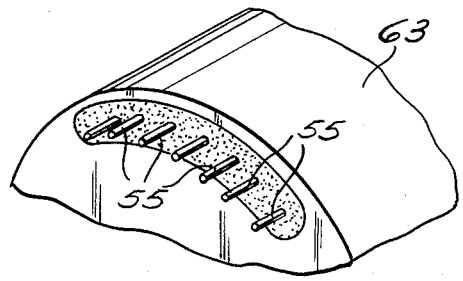
FIG. 5 is a perspective view of a portion of the front of the apparatus shown at FIGS. 3 and 4 showing the electrical interface connector.

As shown at FIGS. 4 and 5 electrical signals to the decoy are communicated to the cannister via one or more connectors 55. At least some of the signals applied to connector 55 are transmitted to commutators 57 which provides electrical connection with rotating slip board ring 59 at contact points 61. The signals received at contact points 61 are communicated to conductors within tow line 15 for communication to electronic circuitry within decoy 13.

The provision of a pyrotechnic charge cavity 33 within end cap 63 permits external loading of the charge within charge cavity 33 without the need to disassemble the cannister assembly. Moreover, the use of bore 31 to direct the force from charge cavity 33 permits the space about bore 31 to be used for other purposes, such as storage of tow line 15. Accordingly, the present invention eliminates the need for a charge cavity between the towline spool and stored decoy and thereby decreases the required overall axial length of the assembly. As shown in FIG. 4, the inner core of the spool 29 has various stepped diameters, these not only accommodate the charge cavity 33 and bearing 43 but serve to reduce towline payout time by reducing the amount of towline stored about the smallest spool core diameter which has little mechanical advantage on brakes 47 and 49 and therefore pays out the slowest.

FIG. 6 illustrates a cross-section of the decoy ring tail 36 which acts as a fin assembly to provide aerodynamic stability when towed. As shown at FIG. 6, the ring tail 36 is preferably formed to have an angularly inclined inner surface 42 of greater length than outer surface 44. In the presently preferred embodiment the ring tail 36 is formed to have a region of greatest thickness at approximately one third the length of the ring 36. It has been found that such a construction provides greater lift and stability to the decoy as it is towed. The ring tail 36 is supported by four struts 37 that attach to the decoy afterbody 26. The ring tail 36 is of the same outside diameter as the cannister 11 so that it forms a continuation of the cannister housing 17 when stored as shown in FIG. 6. Thus, the ring tail 36 is of a larger diameter than the decoy body 13 which provides greater lift and stability to the decoy as it is towed.

As will be apparent to those of ordinary skill in the art the precise arrangement of stationary, bearing and rotating surfaces forming the ejection mechanism may be modified to a variety of different arrangements which still embody the principal structural and functional features of the invention. Accordingly, it is to be understood that the invention, in its broader aspects, is not intended to limited to the particular arrangement of parts set forth in connection with the presently preferred embodiment but may be modified to accommodate the requirements of a particular application without departing from the spirit or scope of the invention.

What is claimed is:

1. A towed decoy and deployment system comprising:

a housing having first and second ends;

a decoy disposed within said housing;

a decoy deployment system disposed within said housing and adapted to urge said decoy outward of said housing, said decoy deployment system comprising:

a rotating spool having an axial bore therethrough, said axial bore having first and second open ends, said first open end abutting said decoy;

a tow line cable connected to said decoy and dispensably stored about said rotating spool; and a pyrotechnic charge cavity disposed proximate said housing's first end and in communication with the second end of said axial bore such that a charge detonated in said said charge cavity causes force to be applied to said decoy to discharge said decoy from the housing's second end.

2. The assembly as recited in claim 1 further comprising centrifugal braking means disposed between said housing and said rotating spool, said braking means being adapted to oppose rotation of said spool to limit deployment of said towline.

3. The assembly as recited in claim 1 further including recess means formed in said housing adjacent said decoy, said recess means being formed to reduce vapor lock within said housing opposing deployment of said decoy.

4. The assembly as recited in claim 1 wherein said decoy comprises a ring tail fin assembly of an generally cylindrical shape, said ring tail unit having an angularly shaped inner surface and a linear outer surface, said inner surface being adapted to facilitate stability of said decoy in flight.

5. The assembly as recited in claim 1 wherein said charge cavity is accessible from said housing first end such that charges may be placed in or removed from said cavity without the need to disassemble said housing.

6. The assembly as recited in claim 1 wherein said decoy includes a ring tail assembly having a greater diameter than the diameter of the body of the decoy, said larger diameter ring tail assembly adapted to facilitate stability of decoy in flight.

7. The assembly as recited in claim 1 wherein rotating spool has multiple or varying core diameters with said diameters selected to reduce the towline cable payout time.

8. A deployment and post-deployment towing apparatus for a towed decoy comprising:

a housing carrying a decoy adjacent one end;

a pyrotechnic charge cavity disposed within the housing adjacent the opposite end of said housing;

a tow line cable stowed within the housing in a position between the charge cavity and the decoy connected to both the decoy and to the housing; and a flow communication path extending between said charge cavity and said decoy for communicating a charge detonated in said charge cavity to said decoy to discharge said decoy from said housing.

9. The apparatus according to claim 8 further comprises: a spool sized to receive the tow cable to be coiled thereabout and wherein the flow communication path comprises an axial bore in the spool.

10. The apparatus according to claim 9 wherein the spool is rotatable within said housing.

11. The apparatus according to claim 10 further comprising:

a brake for controlling the rotation of the spool relative to the housing so that the coiled tow line cable may be controllably dispensed in order that the towed decoy should be controllably separated from the housing after its deployment.

* * * * *